United States Patent [19]

Garrott

[11] 3,964,042
[45] June 15, 1976

[54] STATIC MAGNETIC FIELD METAL DETECTOR

[75] Inventor: William L. Garrott, Gainesville, Fla.

[73] Assignee: Sperry Rand Corporation, New York, N.Y.

[22] Filed: Nov. 11, 1974

[21] Appl. No.: 522,378

Related U.S. Application Data

[62] Division of Ser. No. 373,565, June 25, 1973, Pat. No. 3,896,608.

[52] U.S. Cl. .............................. 340/258 R; 324/41
[51] Int. Cl.² ........................................ G08B 21/00
[58] Field of Search .................. 340/258 R, 258 C; 324/8, 41, 34 PS

[56] References Cited
UNITED STATES PATENTS

| | | | |
|---|---|---|---|
| 2,179,240 | 11/1939 | Breitenstein | 340/258 C |
| 2,696,602 | 12/1954 | Evans | 324/8 X |
| 2,760,182 | 8/1956 | Rechten et al | 340/258 C |
| 3,065,412 | 11/1962 | Rosenthal | 324/41 |
| 3,444,458 | 5/1969 | Scott | 324/41 X |

*Primary Examiner*—David L. Trafton
*Attorney, Agent, or Firm*—Howard P. Terry

[57] ABSTRACT

A static magnetic field detector senses the passage of ferrous or magnetic objects, employing a balanced magnetic field excitation configuration providing substantial self-cancellation of spurious background signals. The pick up coil of the detector is disposed in a spacially reversing static magnetic field, being cooperatively effective to sense the passage of such objects with respect to an extended passage way by reacting to the field distortion caused by the object and producing an alarm or control signal. Further reduction of the effects of spurious background signals is afforded by novel means for processing the signals generated within the detector.

5 Claims, 7 Drawing Figures

STATIC MAGNETIC FIELD METAL DETECTOR

CROSSREFERENCE TO RELATED APPLICATION

This is a division of patent application Ser. No. 373,565, filed June 25, 1973, now U.S. Pat. No. 3,896,608, and entitled "Static Magnetic Field Metal Detector" in the name of William L. Garrott.

BACKGROUND OF THE INVENTION

1. Field of the Invention

The invention pertains to apparatus for detecting the passage of objects composed at least in part of ferrous or magnetic materials including iron and steel and more particularly relates to improved detection devices of the foregoing type exhibiting high immunity to spurious background or noise signals and minimum susceptibility to generation of false alarms or other undesired reactions.

2. Description of the Prior Art

Generally, prior art devices for detecting the presence of metallic ferrous or other objects have one or more disadvantages rendering them of little value in certain applications, especially in the reliable protection of expensive machinery from tramp metal, for instance. Prior art bridge devices often operate with excitation frequencies as high as 20 to 100 KHz and are therefore quite susceptible to the presence of moisture, vegetation, the operator, or the like. They impose on the operator the serious burden of continuous monitoring and adjustment of the calibration of the apparatus. Even at relatively lower excitation frequencies, such detectors are adversely affected by moist conditions, thereby rendering them unsuitable for use where high accuracy, reliability and freedom from generation of false alarms is demanded. Additionally, inductive loop detectors are highly susceptible to noise signals generated in moving parts of machinery, such as metal joints in conveyer belts and gear teeth or other similar projecting parts of rotating machine elements. Such machinery elements produce either false alarms in prior art detectors, or require unsatisfactory reduction of sensitivity. For example, little success has been shown in the prior art in the line of providing equipment for detecting tramp metal entering expensive machines such as farm tools because of the difficulty in separating the signals produced by the tramp metal from the high level of spurious electromagnetic noise produced by moving machine parts of the farm tool.

SUMMARY OF THE INVENTION

The present invention overcomes the aforementioned limitations of prior art metal detectors by the provision of apparatus constructed in such a manner as to be substantially free of adverse effects of moisture and substantially immune to spurious noise signals such as those produced by the proximate moving parts of the protected or monitored machine. The problems of the prior art are overcome by employing specially reversed polarity magnetic field regions of balanced nature for providing substantial cancellation of spurious background signals. The signal pick up coil is cooperatively effective to sense the passage of ferrous or magnetic objects; sensing is achieved by differential signals induced in the pick up coil caused by the distortion of the reversed magnetic fields by the object. Further reduction of the background signal level is effected by filtering and other signal processing of the received signals before actuation of an alarm or control device. The threshold level may be set to an operating level minimizing false reactions.

Use of the invention in a variety of applications such as protection of machinery from tramp metal, monitoring of manufacturing processes, and in security systems is contemplated. For example, the apparatus may be used to detect ferrous tramp metal in wood pulp or in ore on a conveyor belt, thus preventing damage to manufacturing machines receiving such wood pulp or ore. On the other hand, it may be used to recognize desirable ferrous metal parts in certain manufacturing processes. For illustrative purposes, the invention will be described in this disclosure in use for protecting a forage harvesting machine from ingestion of ferrous tramp metal.

The invention is related in general principle to the invention of U.S. patent application Ser. No. 193,846 for a "Static Magnetic Field Metal Detector", filed Oct. 29, 1971 and issued Sept. 11, 1973 as U.S. Pat. No. 3,757,501. in the names of C. L. Bennett, J. D. DeLorenzo, and H. R. Durling and assigned to the Sperry Rand Corporation. It is also related to a division of the latter application, which is now Ser. No. 353,853 for a "Static Magnetic Field Detector", filed Apr. 23, 1973 in the names of the same three inventors. It will be seen that the present invention also overcomes many of the problems of the prior art, while providing these beneficial results in a form relatively easier to manufacture and therefore less expensive to the consumer when initially purchased. Furthermore, the relative simplicity of the present invention inherently provides relatively greater freedom from failure, and therefore reduced maintenance cost to the user.

DESCRIPTION OF THE PREFERRED EMBODIMENTS

Figure 1:
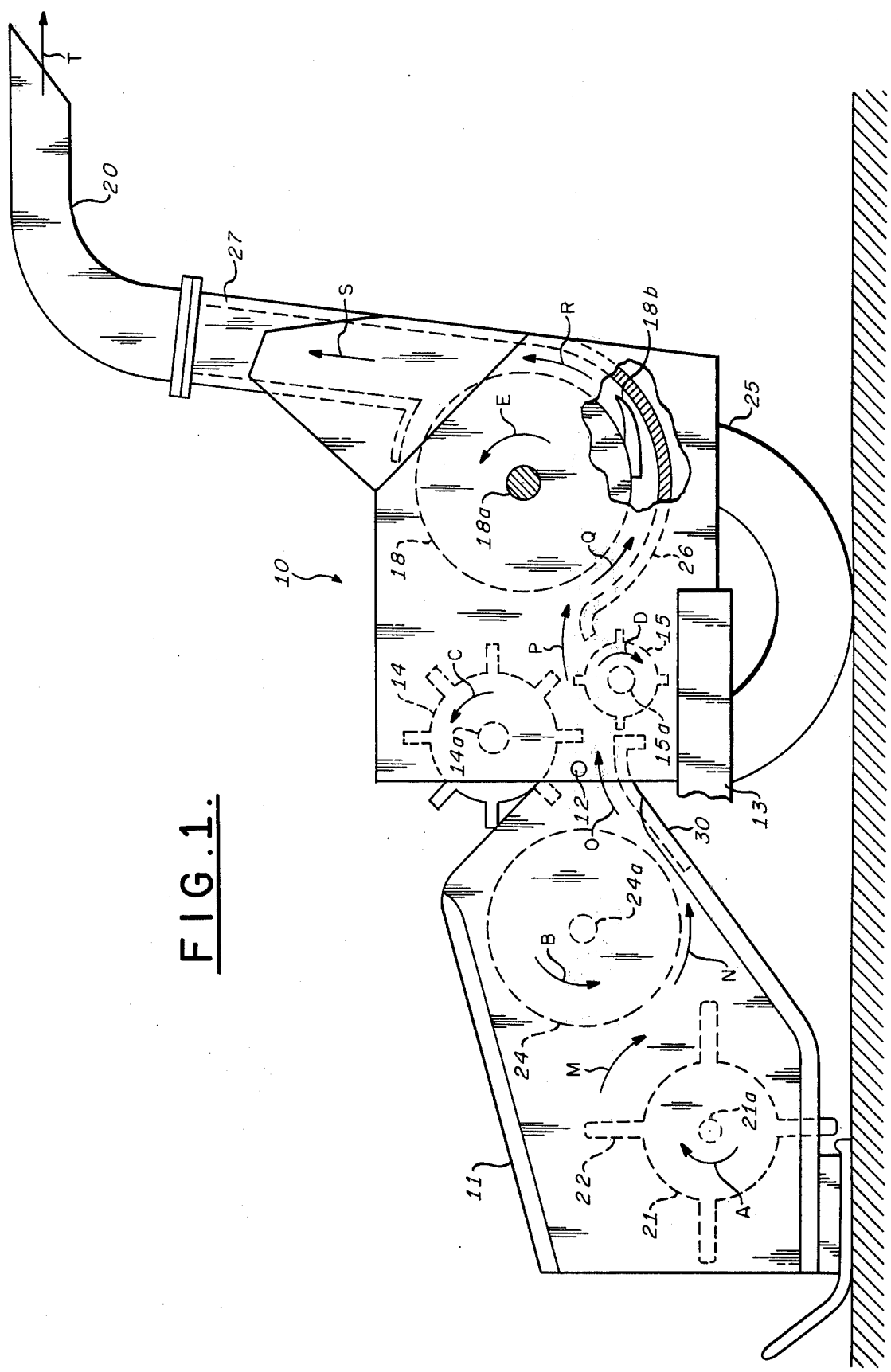
FIG. 1 is a fragmentary elevation view, in part in cross section, of a forage harvesting machine illustrating one application of the invention.

FIG. 1 illustrates an improved forage harvesting machine of one of the kinds in which the present invention may be employed. It will become apparent that the invention may be employed with benefit for the protection of other types of farm and general utility machinery, and that it has other monitoring and alarm actuating applicatons aside from protecting farm machinery from damage caused by the ingestion of objects of ferrous or magnetic materials. The particular forage harvester of FIG. 1 is a representative farm machine and is similar to that described by T. W. Waldrop and H. C. Eberly in the U.S. Pat. No. 3,523,411 for a "Forage Harvester Device", issued Aug. 11, 1970 and assigned to the Sperry Rand Corporation.

The forage harvester of FIG. 1 includes a wheel-mounted frame or housing construction 10 for supporting a forage cutter-head 18 and a crop pick-up unit 11 is pivotally mounted at 12 for support in part from the basic vehicle frame work 13 by which the harvester may be towed by a suitable tractor (not shown). The harvester further includes at least one set of in-feed conveyor rolls 14 and 15, mounted for rotation about substantially parallel axes 14a, 15a and journaled in housing 10. A forage cutter head assembly 18 is mounted within housing 10 spaced from rolls 14, 15 for rotation on shaft 18a and for receiving forage material ejected from rolls 14, 15. A discharge spout 20 extends generally vertically and then horizontally from the rearward portion of housing 10.

The crop pick-up unit 11 comprises a conventional rotatable reel 21 on a shaft 21a having plural radially projecting, laterally spaced pick-up tines or fingers, such as tine 22. A plurality of conventional laterally spaced stripping or doffing members (not shown), between which the tines 22 pass as reel 21 rotates the tines into housing 11, lifts the crop into the region of influence of a conventional rotatable auger 24. Auger 24 has oppositely directed helical flights for directing the crop material from both sides of the auger input toward its center and therefore into the input of the in-feed conveyor rolls 14, 15 Auger 24 is mounted for rotation on shaft 24a and may be of the general type described by L. M. Halls and H. G. McCarthy in the U.S. Pat. No. 3,324,639 for "Auger Header and Crop Conditioner", issued June 13, 1967 and assigned to the Sperry Rand Corporation.

Although a crop pick-up 11 is shown in FIG. 1, it is apparent that a sickle bar or row-crop attachment could also be employed to deliver crop material into in-feed rolls 14, 15. In the unit shown, harvested crop material to be comminuted is picked up by the reel 21 and auger 24 of crop pick-up unit 11 and is delivered by them to the in-feed rolls 14, 15. From the rolls 14, 15, the crop material is metered in a compacted mat-like form to cutter head 18, where it is comminuted by a rotating array of knives such as knife 18b and is finally discharged through discharge spout 20 into a suitable receptacle, such as a truck or farm wagon (not shown).

Upon consideration of the above-mentioned Waldrop et al. U.S. Pat. No. 3,523,411, it will be clear that, for the sake of simplifying the drawing of FIG. 1, a vehicle wheel companion to wheel 25 has not been shown in the drawing of FIG. 1. Also, a plurality of drive belts or other drive means by virtue of which elements including reel 21, auger 24, and rolls 14 and 15 are driven with respect to the power source driving shaft 18a and therefore with respect to cutter head 18 are absent for the sake of simplifying FIG. 1. Such devices are fully described in the above-mentioned Waldrop et al patent and elsewhere and provide means for driving the various rotatable elements at appropriate rotational speeds in the directions indicated by arcuate arrows A, B, C, D, and E. When operated in such fashion, the flow of crop material is over reel 21 and into auger 24 along the paths of arrows M and N and along path O into rolls 14, 15. Ejected from rolls 14, 15 along path P into cutter head 18, the cut forage then follows paths Q and R between the rotating cutter head 18 and guide 26, and finally moves upward along path S within pipe 27 and out of spout 20 along path T. In traversing paths N and O toward rolls 14, 15, the forage material passes over a shaped floor plate 30 indicated in a general fashion by the dotted lines in FIG. 1.

It will be understood that the dimensions and proportions shown in FIG. 1 and in the several figures yet to be discussed are selected for the sake of making the drawings clear, and are therefore not necessarily dimensions or proportions which would be used in actual practice. It will also be understood that, in typical use of the invention on farm machines, the detector may alternatively be located in a variety of places such as at the front of the vehicle, or on the tractor pulling the vehicle.

During various operations using such farm tools, such as sowing, planting, mowing, raking, or the like, it is possible for machine parts made of iron or other magnetic materials to break off or to simply drop off the farm machine being used without knowledge of the operator and to be lost in the field. Typically, these pieces of tramp metal are composed of magnetic materials such as iron, and include bolts, pins, rake teeth, idler pulleys, chain links, mower sickle teeth, hand tools, pieces of wire, and the like. During use of a forage harvester such as that of FIG. 1 for harvesting sorghum, alfalfa, or other types of fodder, such pieces of tramp metal can be picked up by the harvester pick-up unit 11 and may pass into the environs of the cutter head 18, causing extensive damage to it.

To prevent such damage during the critical time of forage harvesting, it is desired to place a tramp metal presence detector in the path M-N-O-P that the crop travels in moving toward cutter head 18. The tramp metal detector is placed in such a location that sufficient time is allowed in which manually or automatically to stop at least rolls 14, 15 before the tramp metal part reaches cutter head 18. It will be apparent that other or alternative moving parts of the forage harvester of FIG. 1 or of other monitored equipment may be automatically caused to stop, such as cutter head 18 or even all of the rotatable parts of the farm machine. The towing tractor may also readily be stopped automatically or by the operator in response to a detector actuated alarm.

Figure 2:
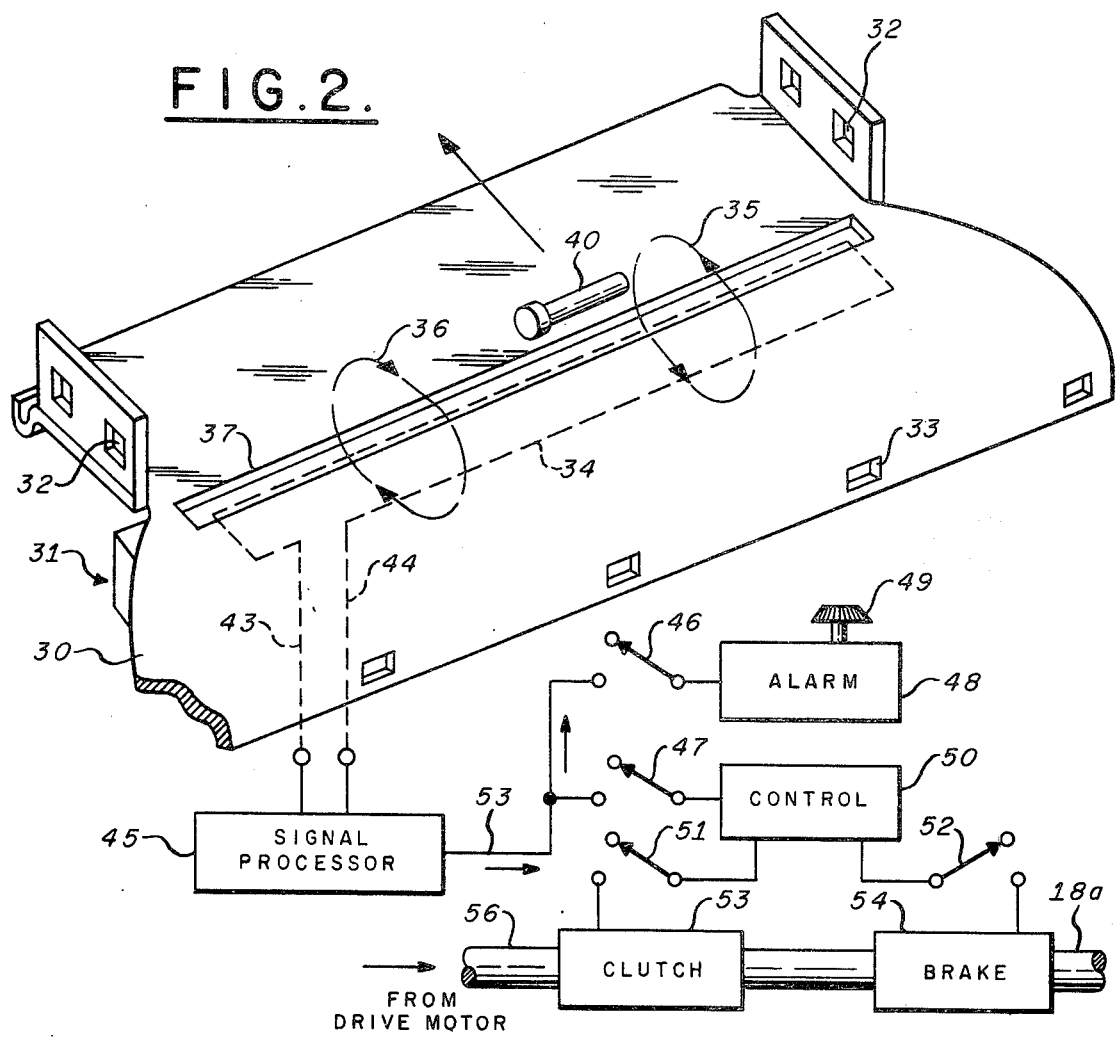
FIG. 2 is a view of a part of the machine of FIG. 1 showing the location of the novel detector relative to a floor of the machine and showing electrical connections between the pick up coils and signal processing and utilization apparatus.

As seen in FIG. 2, the tramp metal sensor 31 is mounted in close association with the floor plate 30 which forms a part of the structure adjacent cutter head housing 10, being bolted to the header 11 in front of the aperture leading to rolls 14, 15 by using conventional bolt holes such as holes 32, 33. Sensor coil 34, indicated by the dotted line in FIG. 2, is preferably a multiple turn coil placed in a particular magnetic field generated by means yet to be discussed in further detail in connection with FIGS. 3 and 4. A desired magnetic field line of flux along one half of the sensor 31 is represented by the vertical-plane loop 35; only one such loop 35 is drawn for convenience and it will be understood that loop 35 represents one loop of a unidirectional magnetic field that extends uniformly alone one half of the sensor coil 34. Loop 36 illustrates one loop of a unidirectional, but reversed polarity magnetic field that extends uniformly along the second half of sensor coil 34. The magnetic fields, if floor plate 30 is made of aluminum or of a plastic or other non-magnetic material, both thread the plate 30 and extend above it to return through plate 30 to their sources. Should plate 30 be made of a magnetic material, a slot 37 placed symmetrically in plate 30 above sensor 31 will permit use of substantially the same magnetic field configuration. Slot 37 is preferably filled with a plastic material to preserve the continuity of the upper surface of plate 30.

In the presence of the spacially reversed magnetic fields represented by loops 35 and 36, an ouput voltage is generated by pick-up coil 34 when an object of ferrous material such as 40 passes through one of the magnetic field regions. It will be understood that signal pick-up coil 34 for sensing any magnetic field change caused by pin 40 is located in the same region as the sources of magnetic field so as substantially to reduce the noise signals coupled to signal pick-up coil 34 caused by rotation of elements such as feed rolls 14, 15, auger 24, and the like.

In the presence of a moving ferrous object 40, a corresponding monitoring alarm signal is generated in coil 34 and is received on leads 43 and 44 leading to signal processor 45. Any output of signal processor 45 appearing on lead 53 may be coupled through manual selector switch 46 to an alarm 48, which may be a conventional visual or audible alarm, including a latching alarm resettable by manual operation of a conventional re-set button 49. A self-resetting system may be used, resetting when the forward motion of the machine has stopped. If the presence of the undesired metal part were forgotten, a new alarm would then be induced if the feed rollers are started, for example. In addition, or alternatively, the operator may use manual selector switch 47 to operate a conventional servo or other control 50. With manual selector switch 51 closed, the operator may cause control 50 to operate a conventional rapid acting clutch 53 placed between the harvester drive motor (not shown) and shaft 18a. He may, in addition, close switch 52 to cause control 50 to operate a conventional rapid-acting brake 54 in order faster to stop rotation of shaft 18a after the declutching event. Shaft 18a may, for example, be the shaft directly driving the cutter head 18 of FIG. 1 or other of the rotating elements of the figure, such as shafts 14a or 15a.

Figure 3:
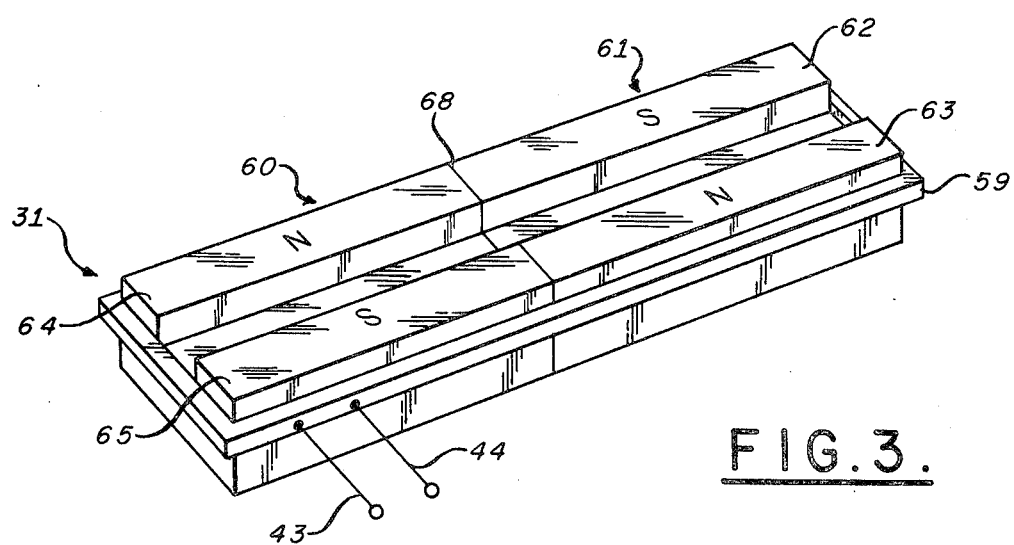
FIG. 3 is a perspective view of one form of the detector for use in the FIG. 2 apparatus.
Figure 4:
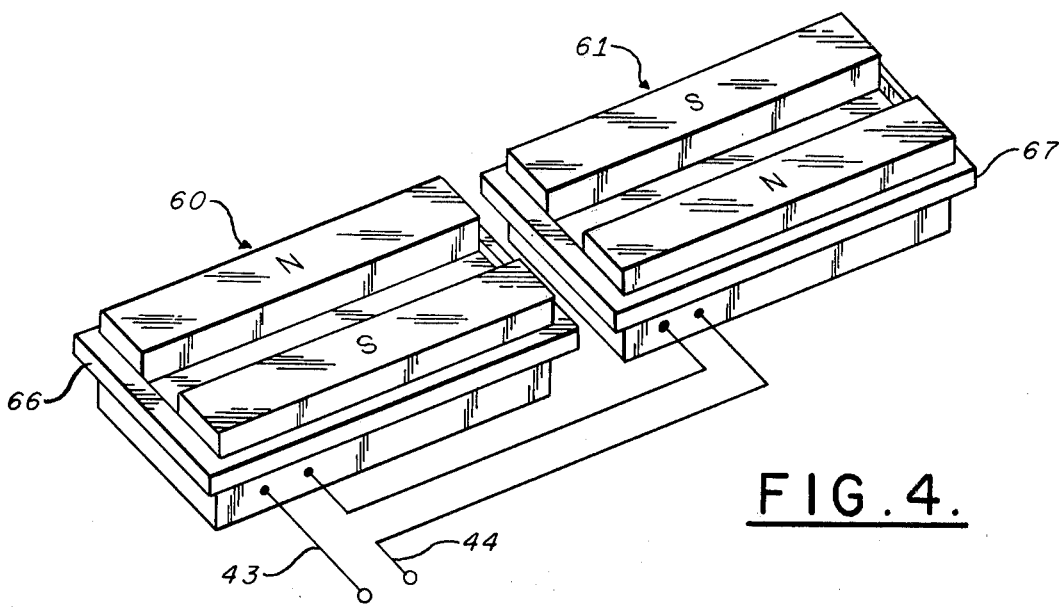
FIG. 4 is a perspective view of an alternative form of the detector of FIG. 3.

FIG. 3 illustrates one method of supplying the two unidirectional magnetic fields represented by the flux lines 35 and 36 of FIG. 2. Elongate magnets 60 and 61 having generally U-shaped cross-sections are employed for the purpose which have polarized arms on one surface, such as arms 62 and 63 of magnet 61, respectively polarized south and north as shown in the figure. Its companion magnet 60 is aligned end-to-end with magnet 61, the arms 64, 65 of magnet 60 having polarities reversed with respect to the poles of arms 62, 63. The multiturn sensor coil 59 is wrapped continuously around the two magnets, the configuration being held together and potted to provide, in the usual manner, appropriate insulation and protection for the assembly. Leads 43, 44 correspond to the similarly identified leads in FIG. 2. As in FIG. 4, it is sometimes convenient to separate magnets 60, 61 if the presence of centrally located structural elements for strengthening floor plate 30 require it. Where such a need arises, separate coils 66, 67 may be provided if connected in series to leads 43, 44, thus providing a device substantially equivalent to that of FIG. 3.

Operation of the sensor and its associated elements will be apparent from FIGS. 2 and 3. As has been observed, the signal pick-up coil 34 is of relatively simple rectangular shape and may be wound directly upon magnets 60, 61 as at 59 in FIG. 3. The magnets 60, 61 are mutually reversed in polarity so that there is a static magnetic field reversal or discontinuity at mid-location 68 placed symmetrically with respect to the major rotating elements of the harvester.

The static magnetic field threading signal pick-up coil 64 produces a total flux $\phi_{60}$ passing through the region above magnet 60 and a total flux $\phi_{61}$ passing through the region above magnet 61 of signal pick-up coil 59. These two fluxes may readily be made substantially equal but opposite by use of appropriate precision in manufacture. A finite voltage V will be produced at the output 43, 44 of coil 59 only when there is a change of flux passing through coil 59:

$$V = N \left[ \frac{d\phi_{60}}{dt} - \frac{d\phi_{61}}{dt} \right]$$

where N is the number of turns of wire in coil 59. A finite differential pulse is produced when object 40 passes above coil 59 in an unsymmetric position with respect to the discontinuity location 68 and the pulse is then passed as a useful alarm signal via leads 43, 44 to signal processor 45 of FIG. 1. Even should bolt 40 pass symmetrically over the discontinuity location 90, it will rarely disturb the halves of coil 59 exactly equally. The usual tramp metal part lacks the symmetry of a bolt and even the bolt with its particular degree of symmetry will rarely be oriented so that an alarm is not actuated.

However, such a property is distinctly beneficial in the invention, since various parts of the forage harvester, because of the deliberate placement of sensor 31, have effectively a considerable degree of symmetry about the mid-plane discontinuity or field reversal point 68 by virtue of its preferred location at the mid-plane of the harvester bisecting the axes of its major rotating parts. For example, the teeth of feed rolls 14, 15, the feed rolls themselves, the auger 24, other rotating parts of the machine and, finally, the main frame and housings of the harvester are effectively symmetric in substantial degree about location 68. Thus, rotation of moving parts of the harvester and vibration of the frame and housing thereof produce, in large measure, flux disturbances in coil 59 which are desirably self-cancelling.

Figure 5:
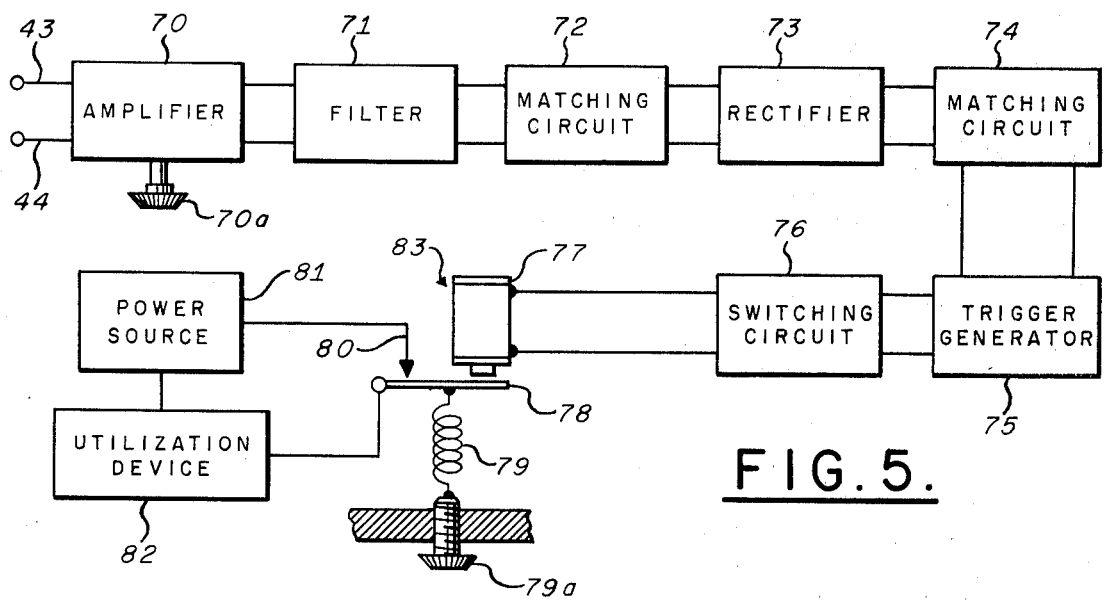
FIG. 5 is a circuit diagram showing electrical connections between the pick up coils of FIGS. 2, 3 or 4 and the components of the signal processor of FIG. 2.

The electrical output signalling the presence of a moving ferrous or magnetic object such as pin 40 at the floor plate 30 is employed for the alarm or control purposes of FIG. 1 using the apparatus of FIG. 5. A voltage amplifier 70 receives the signal present on leads 43, 44 and is equipped with a conventional manually adjustable gain control 70a, amplifier 70 being tailored in the conventional manner to have generally maximum response in the region between one and 20 cycles per second, for example. Filter 71 may be partially instrumental in providing the desired frequency response, which will be low at power line frequencies such as 60 cycles per second, so that the apparatus is not significantly influenced by electrical utility power lines adjacent or in the crop field. This pass band readily enables circuit 71 to pass the frequency spectrum of typical tramp metal objects. The pass band in a typical example may roll off at the low frequency end at substantially 12 dB per octave and at the high frequency end by substantially 18 dB per octave. The pass band characteristics of circuits 70 and 71 thus provide an additional reduction in the relatively higher frequency noise signals induced by motion of the various parts of the protected machine. Further, circuits 70 and 71 may provide a reduction by substantially 60 dB for 60 cycles per second signals that may be induced by the proximity of electrical power distribution lines. Amplification provided by circuit 70 may be used to raise the useful signal incoming on leads 43, 44 from tens of microvolts to hundreds of millivolts, for example. The amplifier 70 may be a universally available integrated circuit voltage amplifier and filter 71 may also be conventional. Gain control 70a is set after installation of the protective device according to the desired response sensitivity.

Figures 6, 7:
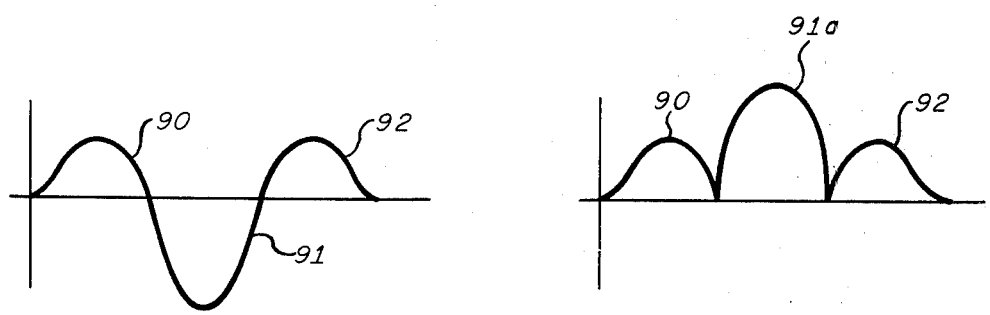
FIGS. 6 and 7 are graphs of wave forms useful in explaining the operation of the invention.

Any output of filter 71 is passed through impedance matching circuit 72 to rectifier 73. Network 72 may be a conventional passive or active impedance matching network, including active matching networks which may include an operational amplifier. Rectifier 72 may be a diode bridge or other full-wave rectifier of conventional type, feeding a second impedance matching network 74, which latter may be similar to matching network 72, the amplifiers of networks 72 and 74 serving in the conventional way as buffers for rectifier 73. Rectifier 73 serves the beneficial role of converting the normally bipolar signal (FIG. 6) appearing on leads 43, 44 in the passage of object 40 into the unipolar signal of FIG. 7. The signal shown in FIG. 6 is generally typical of that produced by a short slug of tramp metal passing above detector 31, having first a positive excursion 90, then a deep negative excursion 91, and finally a positive excursion 92 generally similar to excursion 90. The wave form of FIG. 6 is generally typical, though for longer ferrous objects, the peaks 90 and 92 may be shorter and greater in amplitude while the amplitude of the stretched excursion 91 is diminished. In any event, rectifier 73 converts the wave of FIG. 6 into the unipolar wave of FIG. 7, inverting excursion 91 to form excursion 91a. Thus, the energy of the impulse is more readily used by parts of the circuit yet to be described.

The output of impedance matching circuit 74 is fed to a trigger pulse generator 75 which may be any circuit that, in effect, amplifies the power of any significant alarm signal 90, 91a, 92 for eventual operation of electromechanical relay 83. Trigger generator 75 may be a conventional single-shot multivibrator or Schmidt trigger generator of the type readily available in integrated circuit form. Switching circuit 76, if used, may be a conventional transistor amplifier of the type suitable for amplifying the trigger pulse output of circuit 75. It may be used also further to sharpen or otherwise shape the output of circuit 75, if desired.

Upon the occurrence of an output pulse at trigger generator 75, a current surge of duration, for example, of about one second through the solenoid 77 of electromagnetic relay 83 causes armature 78 to be pulled toward the solenoid 77 against the force of spring 79, closing contact 80 against armature 78, and thus closing the series circuit including battery or power supply 81, contact 80, armature 78, and utilization device 82. Power supply 81 may include conventional filter and regulator elements and may also supply power to those elements of FIG. 5 requiring electrical power. Device 82 may be, for example, any of the alarm or control devices 48, 50, 53, or 54 of FIG. 2. The threshold level at which actuation of utilization device 82 occurs may readily be set by adjustment of any conventional threshold setting adjustment in the elements of the system of FIG. 5, such as by adjusting in a conventional manner the gain adjustment 70a of amplifier 70.

It will be apparent to those skilled in the art that the magnetic field excitation means and the signal pick-up coil or coils of the invention may be adapted to various configurations for various applications. For example, more than the two pick-up coils such as coils 66 and 67 of FIG. 4 may be employed in an elongated structure. Further, the coils 66 and 67 need not lie in a continuous flat plane, but may be arranged in a broad V-shaped configuration. In such a manner, the novel detector system may be designed closely to fit a V-shaped or U-shaped conveyor system or many other types of substantially symmetric elements. Coils 66 and 67 and the selected magnetic field excitation elements need not lie in a horizontal plane, but may be placed in a vertical wall, for instance, in a relatively narrow passage way for detecting movement of metal parts such as fire arms or stolen goods in the pockets or baggage of personnel or other persons.

As has been observed, the invention lends itself to use in detecting undesired ferrous metal to prevent damage to machines. Furthermore, the invention may be used to protect a product from damage due to the inclusion during manufacture of ferrous material where it would not directly harm the manufacturing equipment itself. It is highly desirable, for example, to prevent iron or other parts from entering a furnace for making very pure glass or other ceramic materials such as those requiring very low electrical loss, high dielectric properties. In addition, the novel apparatus is useful, for instance, for determining the desired presence of small ferrous objects on a conveyor belt for operation of an alarm or for direct actuation of machinery such as packaging machinery. It is also apparent that relative motion between a fixed metal object and the moving detector may be sensed according to the invention.

While the invention has been described in its preferred embodiments, it is to be understood that the words which have been used are words of description rather than of limitation and that changes within the purview of the appended claims may be made without departing from the true scope and spirit of the invention in its broader aspects.

I claim:
1. Apparatus responsive to passage of a metal object through one or the other of discrete contiguous portions of a region of space comprising:
   first and second elongate magnetic-field generation means for producing respective first and second unidirectional magnetic fields in said discrete contiguous portions of said region of space,
   said first unidirectional magnetic field being opposite in sense to said second unidirectional magnetic field,
   said first elongate magnetic field-generation means comprising first elongate permanent magnet means having first and second elongate substantially parallel-disposed magnetic poles at one face thereof,
   said second elongate magnetic-field generation means comprising second elongate permanent magnet means having third and fourth elongate substantially parallel-disposed magnetic poles at one face thereof,
   said first, second, third and forth magnetic poles being characterized by production of said first unidirectional magnetic field of one sense adjacent said one face of said first elongate perma- nent magnet means and said second unidirectional magnetic field of opposite sense adjacent said one face of said second elongate permanent magnet means, said unidirectional magnetic fields being substantially equal in magnitude, multiple conductor magnetic field pick-up coil means disposed substantially equally in stationary relation in said first and second unidirectional magnetic fields for providing a substantial detection signal in the presence of said object passing adjacent said first or adjacent said second elongate magnetic field-generation means while affording substantial cancellation of spurious magnetic field responses, and utilization means coupled to said multiple conductor magnetic field pick-up coil means thereby responsive to the passage of said metal object through one or the other of said discrete contiguous portions of said region of space.

2. Apparatus as described in claim 1 additionally including band pass circuit means disposed in series relation between said multiple conductor pick-up coil means and said utilization means.

3. Apparatus as described in claim 1 wherein said first and second elongate magnetic field generation means each have generally U-shaped minor cross-sections.

4. Apparatus as described in claim 2 additionally including in series relation between said band pass circuit means and said utilization means:
   full wave rectifier means responsive to said band pass circuit means,
   trigger pulse generator means responsive to said full wave rectifier means, and
   switching circuit means for supplying power to said utilization means.

5. Apparatus as described in claim 4 wherein said utilization means comprises alarm means.

* * * * *